US010067279B2

(12) United States Patent
Feng

(10) Patent No.: US 10,067,279 B2
(45) Date of Patent: Sep. 4, 2018

(54) BACKLIGHT MODULE AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventor: Qinggang Feng, Beijing (CN)

(73) Assignees: BOE TECHNOLOGY GROUP CO., LTD., Beijing (CN); HEFEI BOE DISPLAY LIGHT CO., LTD., Hefei, Anhui (CN)

(*) Notice: Subject to any disclaimer, the term of this patent is extended or adjusted under 35 U.S.C. 154(b) by 0 days.

(21) Appl. No.: 14/785,793

(22) PCT Filed: May 19, 2015

(86) PCT No.: PCT/CN2015/079292
§ 371 (c)(1),
(2) Date: Oct. 20, 2015

(87) PCT Pub. No.: WO2016/086619
PCT Pub. Date: Jun. 9, 2016

(65) Prior Publication Data
US 2016/0341862 A1 Nov. 24, 2016

(30) Foreign Application Priority Data
Dec. 3, 2014 (CN) .......................... 2014 1 0727368

(51) Int. Cl.
F21V 8/00 (2006.01)
G02F 1/1333 (2006.01)
G02F 1/1335 (2006.01)

(52) U.S. Cl.
CPC ........... *G02B 6/001* (2013.01); *G02B 6/0051* (2013.01); *G02B 6/0055* (2013.01);
(Continued)

(58) Field of Classification Search
CPC ............... F21S 8/00; F21V 7/00; F21V 19/00
See application file for complete search history.

(56) References Cited

U.S. PATENT DOCUMENTS 4,422,719 A * 12/1983 Orcutt ............... B29D 11/00711
362/562
4,733,929 A * 3/1988 Brown ................. G02B 6/0006
359/900

(Continued)

FOREIGN PATENT DOCUMENTS

CN 101075605 A 11/2007
CN 201081122 Y 7/2008
(Continued)

OTHER PUBLICATIONS

First Chinese Office Action dated Apr. 28, 2016; Appln. No. 201410727368.8.
(Continued)

Primary Examiner — Elmito Breval
(74) Attorney, Agent, or Firm — Ladas & Parry LLP

(57) ABSTRACT

A backlight module and a display device are disclosed. The backlight module includes a ring light-guiding body and a light source, wherein the ring light-guiding body includes a first side close to an axis and a second side away from the axis, light generated by the light source is emitted from the second side away from the axis of the ring light-guiding body. Light emission over 360-degree circumference can be achieved by the backlight module. Display over 360-degree circumference can be achieved by the display device including the backlight module.

9 Claims, 6 Drawing Sheets

(52) U.S. Cl.
CPC ..... *G02B 6/0096* (2013.01); *G02F 1/133524* (2013.01); *G02F 1/133603* (2013.01); *G02F 1/133606* (2013.01); *G02F 1/13336* (2013.01)

(56) References Cited

U.S. PATENT DOCUMENTS

| | | | | |
|---|---|---|---|---|
| 4,991,070 | A * | 2/1991 | Stob | F21V 13/04 362/223 |
| 5,095,415 | A * | 3/1992 | Anderson | G02B 6/0096 362/329 |
| 5,622,423 | A * | 4/1997 | Lee | F21L 4/02 362/102 |
| 5,697,695 | A * | 12/1997 | Lin | F21L 4/02 340/321 |
| 5,799,124 | A * | 8/1998 | Zorn | F21S 8/00 362/559 |
| 6,481,882 | B1 * | 11/2002 | Pojar | G02B 6/0096 359/598 |
| 6,621,973 | B1 * | 9/2003 | Hoffman | G02B 6/0096 385/125 |
| 6,685,335 | B1 * | 2/2004 | Yeh | F21L 4/00 362/184 |
| 6,714,711 | B1 * | 3/2004 | Lieberman | G01N 21/7703 362/552 |
| 7,040,776 | B2 * | 5/2006 | Harrell | B65D 51/248 362/101 |
| 7,478,941 | B2 * | 1/2009 | Wu | G02B 5/021 362/223 |
| 7,556,411 | B2 * | 7/2009 | Wu | F21K 9/00 362/219 |
| 8,201,983 | B2 * | 6/2012 | Wang | F21V 29/004 362/373 |
| 2007/0018185 | A1 | 1/2007 | Hung | |
| 2007/0115683 | A1 * | 5/2007 | Park | G02B 6/001 362/555 |
| 2009/0279305 | A1 * | 11/2009 | Lee | G02B 5/045 362/296.01 |
| 2010/0002425 | A1 * | 1/2010 | Tsai | F21S 6/004 362/223 |
| 2010/0164860 | A1 | 7/2010 | Misono | |
| 2010/0315574 | A1 * | 12/2010 | Mizuuchi | G02B 6/001 349/62 |
| 2011/0019401 | A1 | 1/2011 | Chen et al. | |
| 2011/0103757 | A1 * | 5/2011 | Alkemper | C03B 37/01211 385/124 |
| 2011/0261290 | A1 * | 10/2011 | Kim | G02B 6/0021 349/64 |
| 2011/0291560 | A1 * | 12/2011 | Wang | F21V 29/004 315/32 |
| 2011/0310587 | A1 * | 12/2011 | Edmond | G02B 5/02 362/84 |
| 2013/0097881 | A1 * | 4/2013 | Profos | F41G 1/345 33/263 |
| 2014/0346370 | A1 * | 11/2014 | Dobrinsky | A61L 2/10 250/433 |
| 2015/0029742 | A1 * | 1/2015 | Chen | F21K 9/52 362/555 |

FOREIGN PATENT DOCUMENTS

| | | |
|---|---|---|
| CN | 101681060 A | 3/2010 |
| CN | 101963291 A | 2/2011 |
| CN | 202485678 A | 10/2012 |
| CN | 103605228 A | 2/2014 |
| CN | 203757447 U | 8/2014 |
| CN | 203823475 U | 9/2014 |
| CN | 104456313 A | 3/2015 |
| CN | 204201683 U | 3/2015 |
| KR | 20090098328 A | 9/2009 |
| TW | I270992 B | 1/2007 |
| WO | 2008/149509 A1 | 12/2008 |

OTHER PUBLICATIONS

Second Chinese Office Action dated Sep. 18, 2016; Appln. No. 201410727368.8.
International Search Report and Written Opinion both dated Aug. 28, 2015; PCT/CN2015/079292.
The Fourth Chinese Office Action dated Jul. 19, 2017; Appln. No. 201410727368.8.
Third Chinese Office Action dated Mar. 7, 2017; Appln. No. 201410727368.8.

* cited by examiner

BACKLIGHT MODULE AND DISPLAY DEVICE

TECHNICAL FIELD

Embodiments of the present invention relate to a backlight module and a display device.

BACKGROUND

A liquid crystal display (LCD) differs from an organic light emitting displays (OLED) in that, a liquid crystal display does not emit light itself, and a backlight is usually provided by a backlight module to the liquid crystal display, so as to achieve display. The backlight modules are classified into direct-type backlight module and edge-type backlight module according to positions of a light source and a display panel. The light source of the direct-type backlight module is located directly below the display panel, and the light source of the edge-type backlight module is located at one side of the display panel. But no matter for direct-type backlight module or edge-type backlight module, in view of the fact that liquid crystal panel serve for planar displaying, and then all of existing backlight modules are backlight sources with planar luminescence, they cannot satisfy requirements of a special display, such as, ring display.

SUMMARY

According to embodiments of the present invention, there are provided a backlight module and a display device, by the backlight module, light emission over 360-degree circumference can be achieved, so as to satisfy requirements of ring display.

According to an embodiment of the present invention, there is provided a backlight module, which comprises a ring light-guiding body and a light source, the ring light-guiding body comprises a first side close to an axis and a second side away from the axis, and light generated (emitted) by the light source is emitted from the second side away from the axis of the ring light-guiding body.

According to an embodiment of the invention, there is further provided a display device, which comprises a display panel and any one of the backlight module provided by embodiments of the invention, and the display panel is fixed to the second side away from the axis of the ring light-guiding body of the backlight module.

BRIEF DESCRIPTION OF THE DRAWINGS

In order to illustrate the technical solution in the embodiments of the invention or prior art more clearly, the drawings needed to be used in description of the embodiments or prior art will be briefly introduced below; it is obvious that the drawings as described below are only related to some embodiments of the invention, and for those ordinarily skilled in the art, other drawings can also be obtained by them from these drawings without any creative work.

REFERENCE NUMERALS

10—a ring light-guiding body; 11—a first side; 12—a second side; 13—a third side; 14—a fourth side; 20—a light source; 21—a first columnar light-emitting member; 22—a second columnar light-emitting member; 23—a third columnar light-emitting member; 24—a light source supporting structure; 30—a light reflecting structure; 40—a fixing holder; 50—a display panel; 51—a first spliced screen; 52—a second spliced screen; 53—a third spliced screen; 54—a fourth spliced screen; 101—an axis.

DETAILED DESCRIPTION

Hereinafter, the technical solutions in the embodiments of the invention will be described in a clearly and fully understandable way in connection with the drawings related to the embodiments of the invention. It is obvious that the described embodiments are just a part but not all of the embodiments of the invention. Based on the embodiments in the invention, those ordinarily skilled in the art can obtain other embodiment(s), without any inventive work, which should be within the scope sought for protection by the invention.

Figure 1:
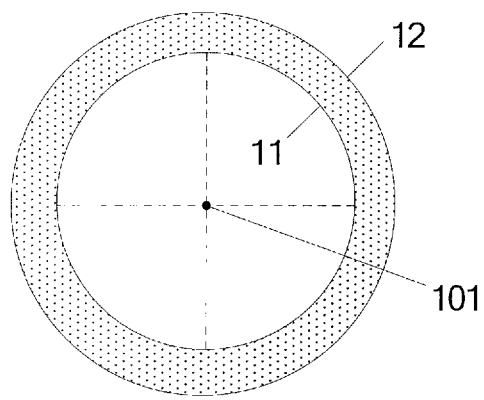
FIG. 1 is a schematic view illustrating a ring light-guiding body provided by an embodiment of the invention.

According to an embodiment of the invention, there is provided a backlight module, which comprises a ring light-guiding body and a light source. As shown in FIG. 1, the ring light-guiding body 10 comprises a first side 11 close to an axis 101 and a second side 12 away from the axis 101, and light generated (emitted) by the light source is emitted from the second side 12 away from the axis 101 of the ring light-guiding body. Namely, according to an embodiment of the invention, there is provided a backlight module, which comprises a ring light-guiding body that comprises a first side 11 being its inner side and a second side 12 being its outer side and a light source, light generated by the light source is emitted from the second side 12.

It is to be noted that, the cross section of the ring light-guiding body is in an annular shape. For example, it may be in a circularly annular shape, or an elliptical annular shape, and it may also be in other annular shape. The present invention does not set a limit to this. The axis 101 is such as, the central axis of the ring light-guiding body. The ring light-guiding body has a certain height in a direction perpendicular to its cross section. As the light-guiding body is in an annular shape, light generated by the light source is emitted from the second side away from the axis of the ring light-guiding body, namely, the second side of the ring light-guiding body is a light emitting surface, and light of the light source goes out through the second side of the ring light-guiding body. That is, the backlight module gives out light around its 360-degree circumference.

It is to be noted that, the ring light-guiding body may be formed by one plastic selected from the group consisting of PMMA (polymethyl methacrylate, PC (polycarbonate), PET (polyethylene terephthalate), and so on. The ring light-guiding body may be formed in one piece by injection molding, blow molding or other way, and it may also be formed by splicing multiple pieces.

According to embodiments of the invention, there is provided a backlight module, which comprises a ring light-guiding body and a light source. The ring light-guiding body comprises a first side close to an axis and a second side away from the axis, and light generated by the light source is emitted from the second side away from the axis of the light-guiding body. Because the light-guiding body is in an annular shape, light of the light source goes out through the second side of the ring light-guiding body. That is, the backlight module gives out light around its 360-degree circumference.

Figure 2:
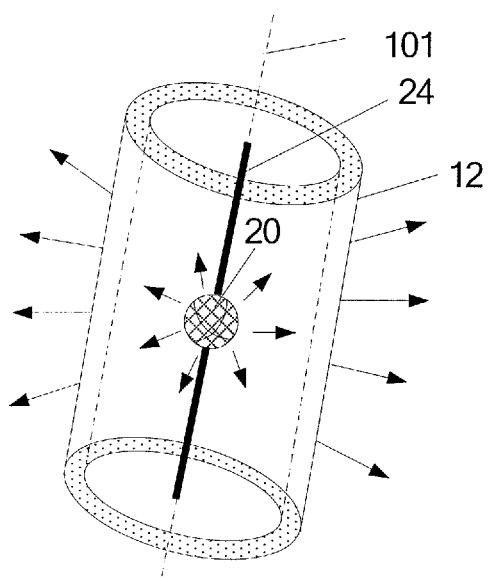
FIG. 2 is a schematic view illustrating a backlight module provided by an embodiment of the invention.

For example, the light source comprises at least one light-emitting member, and the light-emitting member at least gives out light by 360 degrees with the axis of the ring light-guiding body as its center, and is located inside the ring light-guiding body. For example, it may be the case that as shown in FIG. 2, the light source 20 comprises one light-emitting member, the light-emitting member (i.e. the light source 20) shown in FIG. 2 has the shape of a sphere, by which, an all-around, 360-degree luminescence can be realized, the light source 20 is fixed inside the ring light-guiding body 10 by a light-source supporting structure 24, and then light generated by the light source 20 is emitted from the second side 12 of the ring light-guiding body 10. The ring light-guiding body 10 annularly sends out light by 360 degrees along a plane perpendicular to the axis 101.

Of course, arrangements of the light source and the ring light-guiding body are not limited to the mode shown in FIG. 2.

Figure 3:
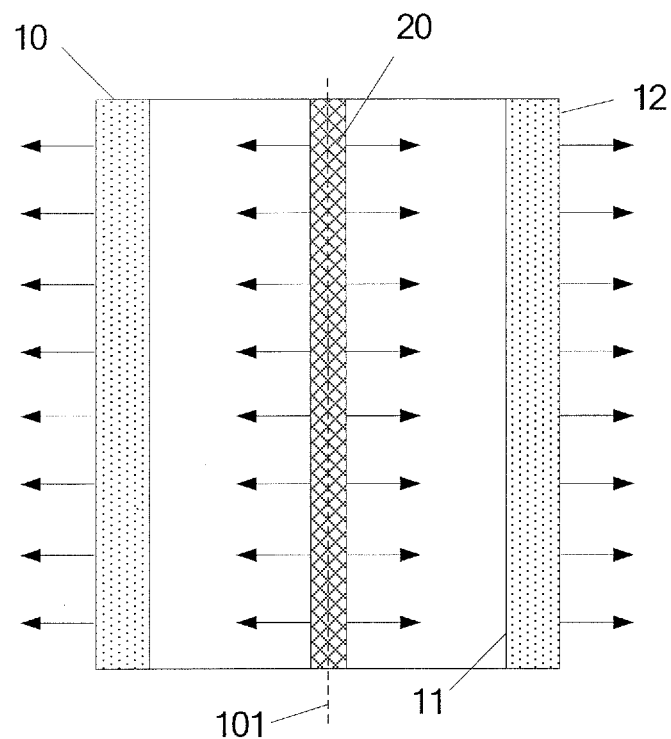
FIG. 3 is a schematic view illustrating another backlight module provided by an embodiment of the invention.
Figure 4:
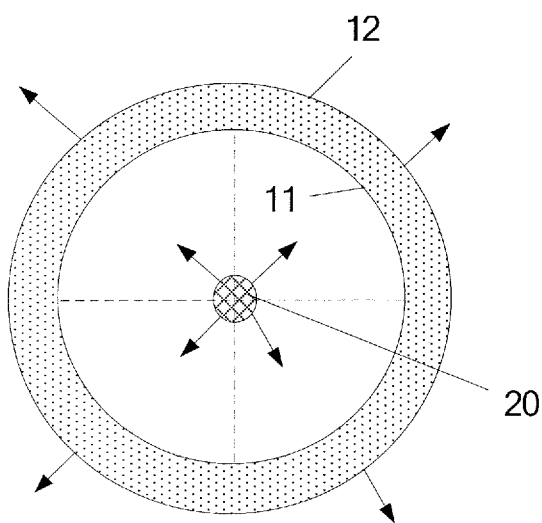
FIG. 4 is a schematically top view illustrating the structure of the backlight module shown in FIG. 3.

For example, as shown in FIG. 3 and FIG. 4, the light source 20 comprises one columnar light-emitting member, and the columnar light-emitting member is located at the axis 101 of the ring light-guiding body 10.

For example, the columnar light-emitting member may be a lamp tube or the like. 360-degree, circular luminescence can be achieved by the lamp tube along its axis, and then, the lamp tube is located at the axis of the ring light-guiding body, and the ring light-guiding body annularly sends out light by 360 degrees along a plane perpendicular to the axis.

Figure 5:
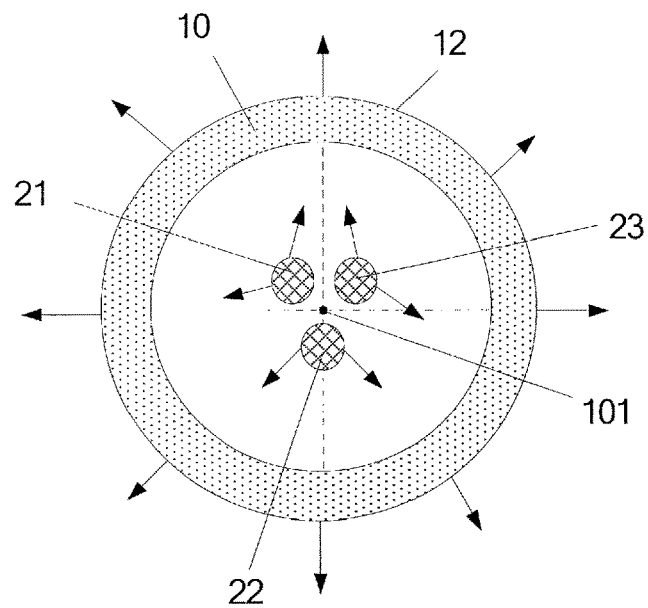
FIG. 5 is a schematic view illustrating another backlight module provided by an embodiment of the invention.

For example, as shown in FIG. 5, the light source comprises three columnar light-emitting members (i.e. a first columnar light-emitting member 21, a second columnar light-emitting member 22, a third columnar light-emitting member 23), and the three columnar light-emitting members (i.e. the first columnar light-emitting member 21, the second columnar light-emitting member 22, the third columnar light-emitting member 23) are arranged in the form of an array along the circular periphery of the axis 101 of the ring light-guiding body 10.

Certainly, the light source may also comprise any other number of light-emitting members, and with respect to a backlight module, luminous intensity of the backlight module can be adjusted by means of controlling the number of columnar light-emitting members. Embodiments of the invention have been described merely with reference to examples in which the light source comprises one columnar light-emitting member or three columnar light-emitting members.

For example, a length of the columnar light-emitting member is not less than a light emitting length of the ring light-guiding body. For example, if the length of the columnar light-emitting member is less than the light emitting length of the ring light-guiding body, then the light emitting intensity of a portion of the columnar light-emitting member corresponding to the ring light-guiding body is larger than the light emitting intensity of that not corresponding to the ring light-guiding body. While in embodiments of the invention, length of the columnar light-emitting member being not less than the light emitting length of the ring light-guiding body can serve to guarantee uniformity of light emission of the ring light-guiding body. For example, as shown in FIG. 3, length of the columnar light-emitting member is equal to the light emitting length of the ring light-guiding body, so as to utilize the light source reasonably, save energy and avoid waste.

Figure 6:
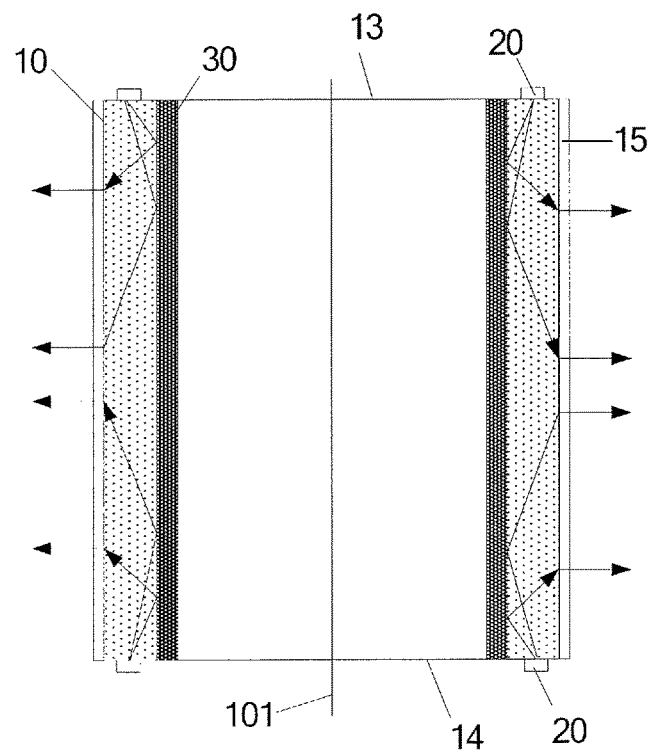
FIG. 6 is a schematic view illustrating another backlight module provided by an embodiment of the invention.

For example, as shown in FIG. 6, the ring light-guiding body 10 further comprises a third side 13 and a fourth side 14 opposite to each other, which are annularly sectional sides, respectively, the light source(s) 20 is/are provided on the third side 13 and/or the fourth side 14, and the light source 20 is a ring-like light source and corresponds to an annularly sectional side. For example, a light reflecting structure 30 is provided on a side of the ring light-guiding body 10 close to the axis 101. The light reflecting structure is beneficial to emit light generated by the light source from the second side of the ring light-guiding body, so as to avoid light generated by the light source from being refracted many times within the light-guiding body.

For example, as shown in FIG. 6, the light reflecting structure 30 is mainly configured to reflect light generated by the light source 20 on the third side 13 and/or the fourth side 14, so as to make light being emitted from the second side away from the axis of the ring light-guiding body 10.

For example, in FIG. 6, with reference to an example in which light source 20 is disposed on the third side 13 and the fourth side 14, respectively, light generated by the light source 20 is emitted from the second side 12 of the ring light-guiding body 10 after reflected by the light reflecting structure 30, and this configuration is beneficial to enhance the uniformity of light emission. Of course, it may also be the case that the light source 20 is disposed merely on the third side 13 or the fourth side 14.

For example, a light homogenized structure 15 is provided on the first side 11 of the ring light-guiding body 10 close to an axis 101 and/or on its second side 12 away from the axis 101. As shown in FIG. 6, a light homogenized structure 15 is disposed on the second side 12 away from the axis 101 of the ring light-guiding body 10. The light homogenized structure may be an optical thin film with a uniform and tiny mesh structure or the like, and light diffusion is achieved by the light homogenized structure, thereby playing a role of solving a problem of glare that results from the concentration of light source, and improving uniformity of light emission.

Figure 7:
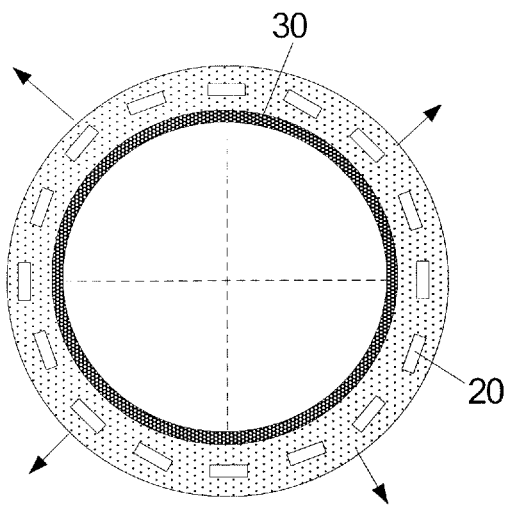
FIG. 7 is a schematically top view illustrating the structure of the backlight module shown in FIG. 6.

For example, the ring-like light source is an annular light-emitting member, or, the ring-like light source comprises a plurality of light-emitting members, and the plurality of light-emitting members are arranged around the periphery of an annular cross section of the ring light-guiding body 10 on the third side 13 and/or the fourth side 14. The light source is an annular light-emitting member, such as, an annular lamp tube, or the like, and then the annular lamp tube is disposed on a section of the ring light-guiding body on one side, and light to be emitted from the ring light-guiding body enters through the section of the ring light-guiding body. Or, as shown in FIG. 7, the light source 20 comprises a plurality of light-emitting members, and for example, it may be a plurality of LEDs (light emitting diodes). The plurality of LEDs may be arranged around the periphery of an annular cross section of the ring light-guiding body 10, so as to form annular luminescence, and light enters the light-guiding body through the section of the ring light-guiding body.

Figure 8:
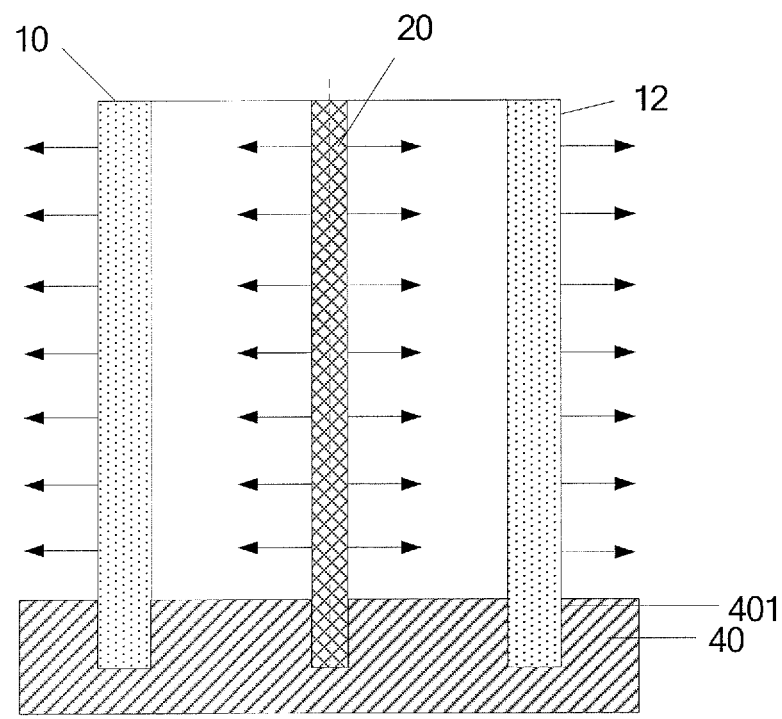
FIG. 8 is a schematic view illustrating another backlight module provided by an embodiment of the invention.
Figure 9:
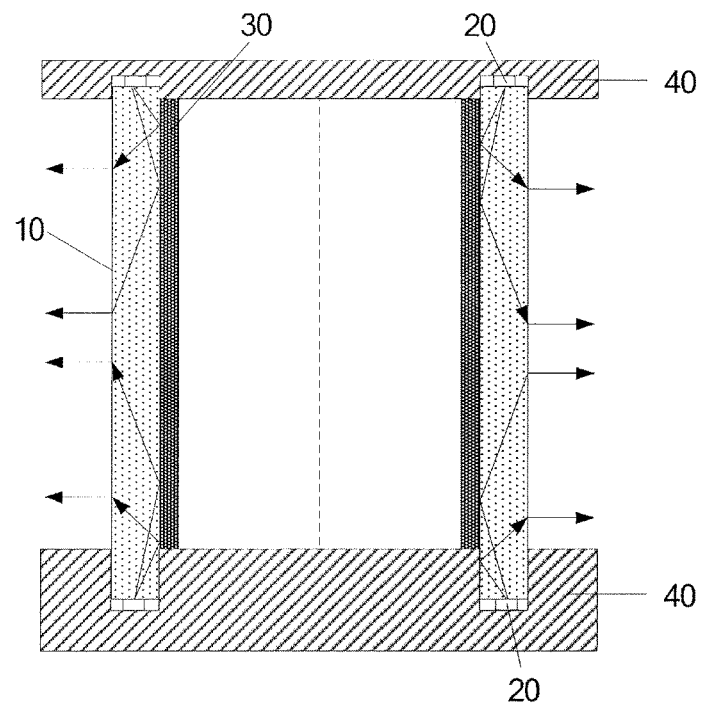
FIG. 9 is a schematic view illustrating another backlight module provided by an embodiment of the invention.

For example, as shown in FIG. 8 and FIG. 9, the backlight module further comprises a fixing holder 40, which is configured to fix the ring light-guiding body 10 and the light source 20.

For example, with respect to the backlight module shown in FIG. 8, the fixing holder 40 may be disposed merely on one side of the backlight module, so as to fix the ring light-guiding body 10 and the light source 20. For example, the fixing holder 40 has a ring-like recess 401, and the ring light-guiding body 10 is fixed within the recess. It is also possible that an electrical signal is provided to the light source by means of setting up a power supply socket within the recess.

With respect to the backlight module shown in FIG. 9, light source 20 is disposed on two opposite sides of the annular cross sections of the ring light-guiding body 10, respectively, and then at either of two opposite sides of the backlight module, there may also be comprised one fixing holder 40, so as to fix the light-guiding body 10 and the light source 20. For example, the fixing holder 40 has a ring-like recess 401, and each of the ring light-guiding body 10 and the light source 20 may be fixed within the ring-like recess. Then, it may also be possible that electrical signals are provided to light source at two sides of the light-guiding body by means of setting up power supply sockets within recesses at two sides, respectively. Certainly, the light source may be fixed in other manners as well, and for example, it is also possible that the light source is fixed on a substrate, and then the substrate is fixed to the ring light-guiding body. There are many kinds of fixing manners of the ring light-guiding body and the light source, and embodiments of the invention have been described only taking those stated above as examples.

According to embodiments of the invention, there is provided a backlight module, which comprises a transparent, ring light-guiding body comprising a first side close to an axis and a second side away from the axis and a light source, wherein light generated by the light source is emitted from the second side away from the axis of the light-guiding body. Because the light-guiding body is in an annular shape, light generated by the light source goes out through the second side of the ring light-guiding body. That is, the backlight module gives out light around its 360-degree circumference.

Figure 10:
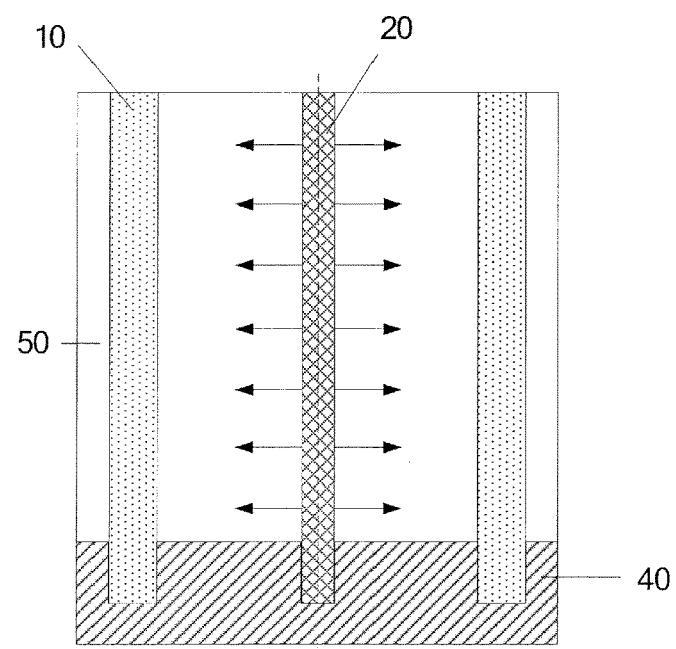
FIG. 10 is a schematic view illustrating a display device provided by an embodiment of the invention.

According to an embodiment of the invention, there is further provided a display device. As shown in FIG. 10, the display device comprises a display panel 50 and any one of the backlight module provided by embodiments of the invention, and the display panel 50 is fixed to the second side 12 of the ring light-guiding body 10 of the backlight module away from an axis 10. Namely, the display panel 50 is fixed to a light emitting side of the backlight module, and backlight is provided to the display panel by the backlight module, so as to achieve display. The display panel may be attached to the second side away from the axis of the ring light-guiding body by glue or the like, may also be fixed to the second side away from the axis of the ring light-guiding body by other means, and so on.

Figure 11:
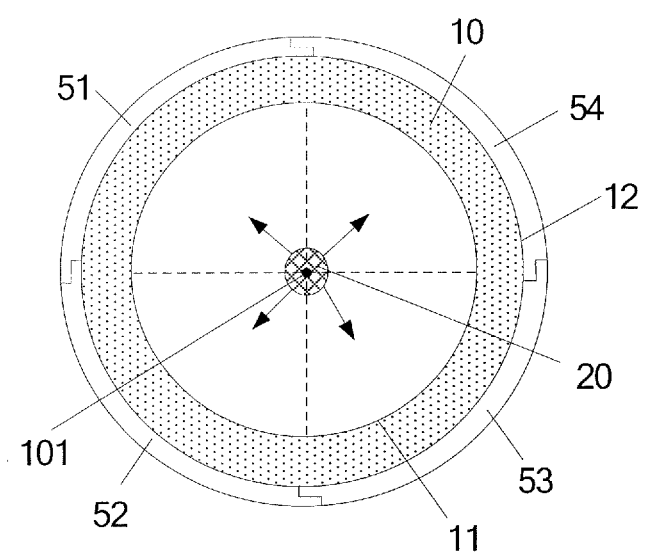
FIG. 11 is a schematically top view illustrating the structure of the display device shown in FIG. 10.

For example, the display panel is formed by splicing a plurality of spliced screens. As shown in FIG. 11, the display panel comprises a first spliced screen 51, a second spliced screen 52, a third spliced screen 53 and a fourth spliced screen 54, wherein the first spliced screen 51, the second spliced screen 52, the third spliced screen 53 and the fourth spliced screen 54 are spliced annularly. Of course, the splicing manner of multiple spliced screens is not limited to this, either, and embodiments of the invention have been described only taking those stated above as examples. Where, the display screen may be a flexible display panel, and then the display screen may be a whole piece to encircle a ring light-guiding body 10.

With respect to the display device provided by embodiments of the invention, the ring light-guiding body of its backlight module annularly sends out light from a second side away from the axis, namely, the backlight module gives out light around its 360-degree circumference. The display panel is fixed to the second side away from the axis of the ring light-guiding body of the backlight module, and so, display over 360-degree circumference can be achieved by the display device.

It is to be noted that, embodiments of the invention and its drawings are merely used to illustratively describe parts relevant to the present application, and as for other parts that are not involved, they may make reference to common designs.

Descriptions made above are merely specific embodiments of the invention, but the protection scope of the invention is not limited thereto. Changes or replacements, as easily conceivable by those skilled in the art within the technical scope disclosed by the invention, shall be encompassed within the protection scope of the invention. Therefore, the protection scope of the invention shall be determined by the protection scope of attached claims.

This patent application claims the benefit of priority from Chinese patent application No. 201410727368.8, filed on Dec. 3, 2014, the disclosure of which is incorporated herein in its entirety by reference as a part of the present application.

What is claimed is:

1. A backlight module, comprising a ring light-guiding body and a light source, wherein the ring light-guiding body comprises a first side close to an axis and a second side away from the axis, and wherein light generated by the light source enters the ring light-guiding body from the first side and is emitted from the second side away from the axis of the ring light-guiding body,
    wherein the light source comprises at least one columnar light-emitting member, and the columnar light-emitting member is located inside the ring light-guiding body, and wherein a length of the columnar light-emitting member is not less than a light emitting length of the ring light-guiding body,
    the ring light-guiding body comprises a light homogenized structure disposed on the first side close to the axis and/or the second side away from the axis, the light homogenized structure comprising an optical thin film with a uniform and tiny mesh structure.

2. The backlight module claimed as claim 1, wherein the light-emitting member at least gives out light by 360 degrees with the axis of the ring light-guiding body as its center.

3. The backlight module claimed as claim 1, wherein the light source comprises one columnar light-emitting member, and the columnar light-emitting member is located at the axis of the ring light-guiding body.

4. The backlight module claimed as claim 1, wherein the light source comprises three columnar light-emitting members, and the three columnar light-emitting members are arranged in an array along the circular periphery of the axis.

5. The backlight module claimed as claim 1, further comprising a fixing holder, wherein the fixing holder is configured to fix the ring light-guiding body and the light source.

6. The backlight module claimed as claim 1, wherein the fixing holder has a ring-like recess, and the ring light-guiding body is fixed within the ring-like recess.

7. A display device, comprising a display panel and the backlight module claimed as claim 1, wherein the display panel is fixed to the second side away from the axis of the ring light-guiding body of the backlight module.

8. The display device claimed as claim 7, wherein the display panel is formed by splicing a plurality of spliced screens.

9. The display device claimed as claim 7, wherein the display panel is a flexible display screen.

* * * * *